United States Patent [19]
Atkins

[11] Patent Number: 6,149,345
[45] Date of Patent: *Nov. 21, 2000

[54] HIGH-VACUUM GROUNDWATER AND SOIL REMEDIATION SYSTEM AND RELATED METHOD AND APPARATUS

[76] Inventor: Parker E. Atkins, 116 N. Plant Ave., Boerne, Tex. 78006

[*] Notice: This patent is subject to a terminal disclaimer.

[21] Appl. No.: 09/233,239

[22] Filed: Jan. 19, 1999

Related U.S. Application Data

[63] Continuation of application No. 08/971,277, Nov. 17, 1997, Pat. No. 5,860,767, which is a continuation of application No. 08/707,858, Sep. 9, 1996, Pat. No. 5,688,076.

[51] Int. Cl.[7] .............................. B09C 1/00; C02F 1/40; E21B 43/24
[52] U.S. Cl. ........................ 405/128; 166/53; 166/267; 210/170; 210/747; 210/767; 210/787
[58] Field of Search .............................. 405/128; 166/53, 166/267, 370; 210/170, 188, 747, 767, 787

[56] References Cited

U.S. PATENT DOCUMENTS

| 5,056,676 | 10/1991 | Hess et al. | 166/267 |
|---|---|---|---|
| 5,358,357 | 10/1994 | Mancini et al. | 405/128 |
| 5,387,057 | 2/1995 | DeLoach | 405/128 |
| 5,441,365 | 8/1995 | Duffney et al. | 405/128 |
| 5,529,121 | 6/1996 | Partridge et al. | 166/267 |
| 5,613,805 | 3/1997 | Schmid | 405/128 |
| 5,688,076 | 11/1997 | Atkins | 405/128 |
| 5,720,885 | 2/1998 | Moos | 210/710 |
| 5,860,767 | 1/1999 | Atkins | 405/128 |

OTHER PUBLICATIONS

Atkins & Fly, Inc. Process Flow and Instrumentation Diagram, Oct. 19, 1994.
W.E.S., Inc., Vacu–Point Technology, date unkown.
Atlantic Fluidics, Fluid–Vac Liquid Ring Pumps for Environmental Applications, date unknown.

Primary Examiner—George Suchfield
Attorney, Agent, or Firm—Wayne J. Colton, Inc.

[57] ABSTRACT

Systems and techniques for remediation of soil, vapor and groundwater contaminated with hydrocarbons. The system is ideally suited for easy integration into a mobile remediation unit that uses a liquid ring vacuum pump to extract a contaminated mixture from a sub-surface formation and direct it into a separator, which also serves to shield the high-flow vacuum pump from non-gaseous phases of the contaminated matter that would otherwise reduce its efficiency. Cooling systems are employed to render the unit more independent and self-contained, and an automatic vent and low-shear pump-down cycle is used to transfer liquid phases to fractionation subsystems with minimal emulsification.

1 Claim, 7 Drawing Sheets

HIGH-VACUUM GROUNDWATER AND SOIL REMEDIATION SYSTEM AND RELATED METHOD AND APPARATUS

RELATED APPLICATIONS

This application is a continuation of Applicant's U.S. patent application Ser. No. 08/971,277 filed Nov. 17, 1997, now U.S. Pat. No. 5,860,767 issued Jan. 19, 1999, which is a continuation of U.S. patent application Ser. No. 08/707,858 filed Sep. 9, 1996, now U.S. Pat. No. 5,688,076 issued Nov. 18, 1997.

FIELD OF THE INVENTION

The present inventions relate generally to environmental restoration and, more particularly, to apparatus and methods for remediation of hydrocarbon contaminated soil or groundwater.

BACKGROUND OF THE INVENTION

Since the beginning of the industrial revolution, United States and foreign crude oil refining and chemical companies have developed many useful petrochemical products. While these new products have provided solutions to many of the problems that have arisen during the advancement of industrialized society, the demands of industry for new and innovative petrochemical products have increasingly required development of more efficient means for handling and transporting both unrefined and refined petroleum products. Many of these means involve transporting products via pipeline, truck, ship, rail, or other methods to bulk storage facilities or end users. Unfortunately, in handling these petroleum and petrochemical products, there have been many instances of their release into the environment.

Release of petroleum or petrochemical products into the environment can have far reaching affects, ranging from minor innocuous impact to total devastation depending upon the particular contaminant released, the quantity released, proximity to human populations, the sensitivity of the area and many other factors. Recognizing the concerns associated with this growing industry, the United States Congress enacted the National Environmental Policy Act ("NEPA") of 1969 followed by establishment of the Environmental Protection Agency ("EPA"). Prior to this legislation and for several years afterward, however, state and federal agencies failed to aggressively pursue environmental violators, assuming the largely unreported releases to be minor, the public pressure of the environmental movement having not yet reached maturity.

As a result of this environmental disinterest, little is known about soil and groundwater remediation technology prior to the 1980's. As public pressure began to mount, however, numerous environmental equipment manufacturing companies began to produce equipment designed to pump oil or other phase-separated hydrocarbons released onto surface water or into groundwater. Early equipment designs included the Oil Recovery Services ("ORS") trademark "FILTER SCAVENGER" floating disk which utilized an electrical pump to transfer recovered fluids to a holding tank. Although improvements were made to the system, including utilization of a hydrophobic screen to repel water and allow only oil to enter the system, it remained limited to low flow rates.

Soon after introduction of this early system, the market was flooded with down-hole oil pump systems. These systems were designed to pump oil to an above ground reservoir for storage. Pneumatic pump systems were designed to then pump the total fluids (oil and water) to an oil-water separator located on the surface. These systems were soon coupled with submersible groundwater pumps in an effort to increase oil recovery, with some success.

Contaminated soil, on the other hand, was primarily addressed in the 1980's by excavation and removal, to the extent possible. When deeper soils were impacted by a hydrocarbon release and could not be effectively reached by excavation, the soils remained in place. But then in the mid-1980's, a new and highly effective soil remediation process called vacuum extraction was developed. Vacuum extraction removes the volatile organic compounds from the soil by the application of negative pressure on a well which is screened through the hydrocarbon impacted soil.

Soon after their advent, vacuum extraction (for soil remediation) was combined with oil pumps and down-hole submersible pumps (for groundwater remediation) in an effort to expedite remediation. Vacuum extraction systems were typically connected to dedicated vacuum extraction wells as were oil pumps with groundwater submersible pumps. These systems proved highly effective in soils which exhibited high transmissivity (sand, gravel and other permeable formations) where fairly high flow rates could be achieved. However, in soils with low transmissivity, this combined approach failed to produce favorable results due to gravitational limitations and long-term residual impact to groundwater.

Finally, a dual phase vacuum extraction technique was introduced wherein a liquid ring vacuum pump was utilized to recover groundwater while simultaneously extracting vapors from a formation. This type of vacuum pump system uses groundwater or tap water to create a vacuum within the pump. Groundwater, with dissolved hydrocarbon compounds, and vapor pass directly through the liquid ring pump and into a holding tank prior to transfer to a treatment system. While this type of pump overcame the limitations prevalent to most prior systems, this technology is limited to sites which have soil contamination coupled with dissolved hydrocarbon contamination in groundwater. A dual-phase extraction system is not suitable for the recovery of phase-separated hydrocarbons (free product and oil) on the groundwater because all fluids pass directly through the pump impeller which causes an inseparable emulsion due to shearing of the fluids. The only modifications proposed to this system have required introduction of separate down-hole pumps, greatly increasing capital equipment and project lifetime maintenance costs.

Prior to the introduction of the present invention, there has been introduced no method of recovering phase separated hydrocarbons, groundwater, and vapors from soil which exhibits low transmissivity without causing emulsion and without using separate down-hole pumps. Prior existing technology will either create an inseparable emulsion due to shearing of the fluids, or require down-hole pumps in each well in conjunction with a high vacuum pump system.

Further, prior existing liquid ring vacuum pump systems require either tap water, groundwater or a combination of both in order to create the necessary vacuum pump seal. At remote sites, where tap water is relatively unavailable and groundwater must be used, the total dissolved solid content of the groundwater typically results in high maintenance costs for the liquid ring pump.

It is a primary object of the present invention to provide a high-vacuum groundwater and soil remediation system capable of recovering phase separated hydrocarbons, groundwater and/or vapors from a single well, in soils of high or low transmissivity and without emulsification of the free product.

It is a further object of the present invention to provide a high-vacuum groundwater and soil remediation system having a self-contained cooling seal water system, operable without need for a continuous source of tap water and impervious to maintenance problems as have plagued prior art systems.

It is yet another object of the present system to provide a high-vacuum groundwater and soil remediation system which is self-contained and portable for rapid response to a variety of locations.

SUMMARY OF THE INVENTION

It is a fundamental objective of the present invention to improve over the prior art. This basic objective is served by several aspects of the present invention, which will be evident from a review of the claims and the foregoing and following discussions, especially when viewed in light of the background art.

In meeting these objects, the present invention generally comprises a centrifugal separating tank in a first portion of a multi-phase hydrocarbon remediation system having a vapor phase outlet, a liquid phase outlet and a multi-phase inlet. A vacuum source, such as a liquid ring vacuum pump, is fluidly connected to the vapor phase outlet to draw a flow of contaminated matter through the multi-phase input and into the centrifugal separating tank. A vent, which in one embodiment may comprise a solenoid-actuated valve, is provided for reducing the negative pressures induced by the vacuum source, thereby enabling liquid phases to flow from the centrifugal separating tank through the liquid phase outlet.

In at least one embodiment, liquid phases are pumped with a low-shear pump, such as a single or double diaphragm pneumatic transfer pump, from the centrifugal separating tank and into a second portion of the remediation system for further separation of hydrocarbon contaminants. The second portion of the remediation system may comprise a fractionation system which may be further provided with a coalescing medium. In yet a further embodiment, a dampening influent may be provided between the low-shear pump and the fractionation system in order to minimize emulsification of the liquid phases, thereby facilitating fractionation of the liquid phases. The low-shear pump, and the vent, may be automatically actuated by a fill sensor adapted to detect the level of liquid phases within the centrifugal separating tank.

Finally, in yet another embodiment, the hydrocarbon remediation system may be provided with a vapor treatment system in fluid communication with the vapor phase outlet of the centrifugal separating tank. Such a treatment system may comprise a thermal oxidizer, a flare or a granular activated carbon system, and is used to remove organic compounds from the vapor phases of the contaminated flow.

In operation, the vacuum source is used to draw a flow of contaminated matter through the multi-phase inlet and into the centrifugal separating tank. Vapor phases, which escape the centrifugal separating tank through the vapor phase outlet are treated to remove organic compounds. When the liquid phases within the centrifugal separating tank reach a predetermined level, the vent is opened to reduce the negative pressures within the centrifugal separating tank where after the liquid phases may flow from the centrifugal separating tank through the liquid phase outlet. The low-shear pump is used to pump, with minimized emulsification, the liquid phases into the second portion of the remediation system where hydrocarbon contaminants are further removed from the liquid phases.

Although some details are summarized above, this summary generally only begins to touch on the broader technological categories to which the present invention is directed. Many other objects, features, and advantages of the present invention will be evident to those of skill in the art in view of the foregoing and the following more detailed description, particularly when considered in light of the prior art and/or the claims appended hereto.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Figure 1:
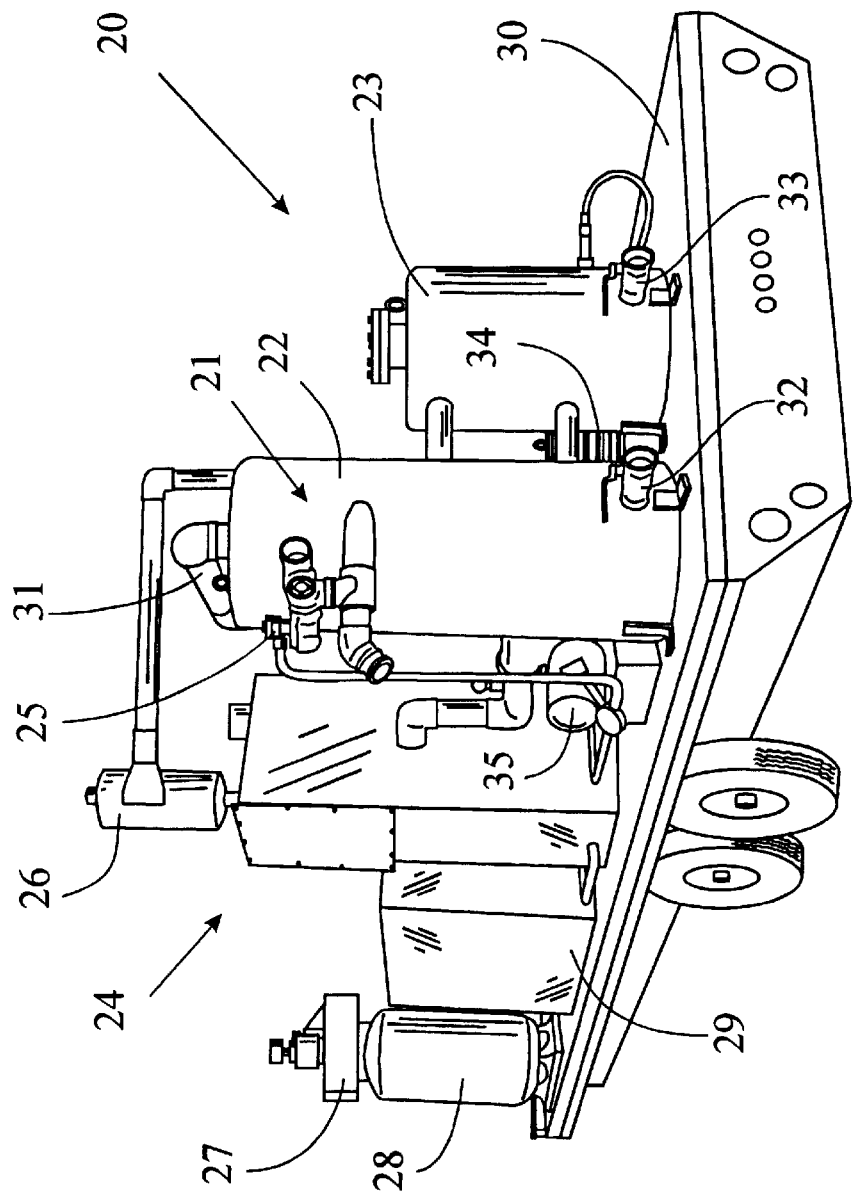
FIG. 1 shows, in perspective view, the preferred embodiment of the present invention, a high-vacuum ground water and soil remediation system 20, as configured upon a mobile chassis 30.

Although those of ordinary skill in the art will readily recognize many alternative embodiments, especially in light of the illustration provided herein, this detailed description is exemplary of the presently preferred embodiment of the present invention, the scope of which is limited only by the claims appended hereto. Now referring particularly to FIG. 1, the preferred embodiment of the present invention, a high-vacuum ground water and soil remediation system 20, generally comprises primary and secondary air-water separators 22, 23 having an air, water and product inlet assembly 21 and a solenoid valve vacuum release mechanism 25; a liquid ring vacuum pump 34 with self-contained cooling system 24 comprising an air-water separator 26, circulation water cooling tower 60, cooling tower blower 35, and cooling water holding tank 119 for use in humid or cooler environments or, alternatively, a radiator-type closed cooling system for use in arid or warmer environments; a double diaphragm pneumatic transfer pump 78 in operable communication with an industrial air compressor 27 through a solenoid valve pump control mechanism 127; oil-water separating fractionation and double-contained product storage tanks 90, 118; an electrically operated centrifugal transfer pump 124 and effluent 125; and various additional components such as an electrical power source and breaker panel, operating control panel 129, and appropriate containment such as the mobile chassis 30 shown, an aircraft-type roll-on package, or a permanent fixture. The preferred embodiment of the present invention is commercially available from Atkins & Fly, Inc. of Boerne, Tex.

Figure 2:
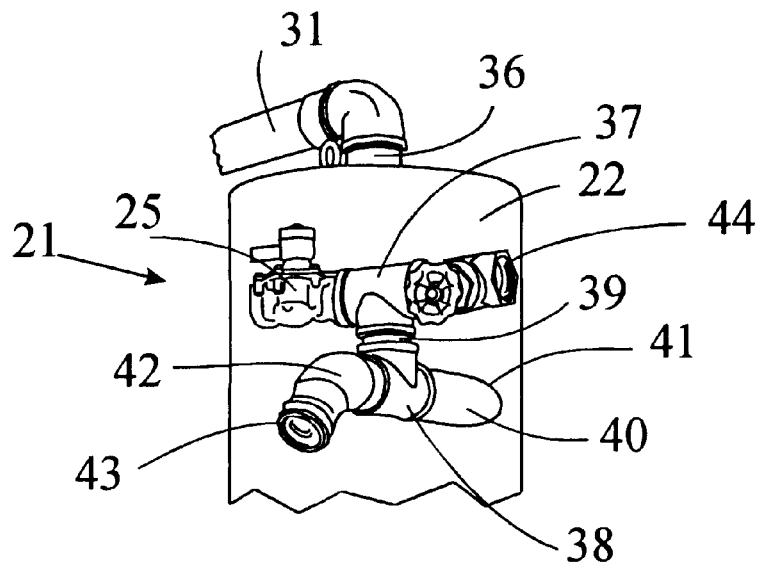
FIG. 2 shows, in detail perspective view, the air, water and product inlet assembly 21 of the preferred embodiment of the present invention, as dependently attached to the primary air-water separator 22.

One, two or three phase contaminant enters the ground water and soil remediation system 20 through an air, water and product inlet assembly 21 dependently attached upstream to a primary air-water separator 22. Referring now specifically to FIG. 2, the provided assembly 21 generally comprises an upper and a lower 3-inch, galvanized steel tee 37, 38 in orthonormal orientation about an interposed galvanized steel bushing 39; a male, locking cam-type, quick-connect coupler 43 dependently attached to the lower tee 38 through a 3-inch, galvanized steel, 45-degree ell joint 42; a 3-inch, carbon steel inlet pipe 40 providing air, water and product communication between the lower tee 38 and the primary air-water separator 22; and a 3-inch, bronze gate valve 44 for fresh air insertion in control of vacuum and air emission levels. Air emissions are controlled by increasing or decreasing internal vacuum levels through manual adjustment of the bronze gate valve 44.

The air, water and product inlet assembly 21 is dependently attached to the primary air-water separator 22 by aligning and welding the inlet pipe 40 to the primary air-water separator 22 such that the inlet pipe 40 is tangent to the circumference and parallel to a plane normal to the central axis of the primary air-water separator 22. In the preferred embodiment, the lower lip of the inlet pipe 40 is positioned approximately 40 inches from the lower surface of the dish bottom of the primary air-water separator 22. As will be understood herein, fluids are centrifugally separated within the primary air-water separator 22; in order to sustain such centrifugal separation, it is necessary that the attaching weld 41 be smooth so as to avoid introduction of turbulence disruptive of the desired laminar fluid flow.

The primary and a secondary air-water separators 22, 23 are integrally constructed of plate steel in compliance with applicable industry standards for pressure vessel manufacture. As will be understood herein, the primary and secondary air-water separators 22, 23 may expect to receive internal working vacuums of up to 29 inches of mercury; therefore, in accordance with United States industry standards, the primary and secondary air-water separators 22, 23 of the preferred embodiment are fabricated from a plate steel of no less than 0.156 inches thickness and containing no molybdenum which, as is known to those of ordinary skill in the art, would generate a dangerously brittle steel inappropriate for pressure vessel applications. The primary and secondary air-water separators 22, 23 are additionally designed to be right circular, cylindrically shaped with dish tops and dish bottoms in order to further diminish vacuum implosion hazard.

As also will be understood, a plurality of 3-inch interconnecting steel pipes 45, 46 is desirably interposed between the primary and secondary air-water separators 22, 23 for the communication of water and small particulate from the primary air-water separator 22 to the secondary air-water separator 23. Because heavy construction is necessary to comply with pressure vessel standards and multiple interconnecting steel pipes 45, 46 are desired, it can often be difficult to align the primary and secondary air-water separators 22, 23 for assembly; therefore, although alternate methods in full appreciation of all critical aspects of the present invention, such as threaded pipe connections, may be employed with only corresponding sacrifice to ease of assembly, the primary and secondary air-water separators 22, 23 of the preferred embodiment are of a unitary construction wherein provided interconnecting steel pipes 45, 46 are welded into alignment during vessel manufacture. In order to then facilitate handling of the resulting cumbersome structure, a steel lifting ring 47, 48 is preferably provided attached to the upper surface of each respective vessel's dish top. Finally, in the preferred embodiment a plurality of securement brackets 51a–51f constructed of 2-inch, angle iron weldments are provided adjacent the respective dish bottoms of the primary and secondary air-water separators 22, 23.

The primary air-water separator 22 of the preferred embodiment is approximately 60 inches in height along the central axis and approximately 24 inches in uniform diameter. The secondary air-water separator 23 of the preferred embodiment is also approximately 24 inches in uniform diameter but is of lesser height—approximately 38 inches along the central axis. The primary and secondary air-water separators 22, 23 are each provided with 3-inch, steel couplers 49, 50, flanged approximately 1 inch above the respective dish bottom weld and oriented for convenient access during clean-out operations described further herein.

A high vacuum, of up to 29 inches of mercury, is applied to the primary and secondary air-water separators 22, 23 through an outlet 36 provided in the primary air-water separator's dish top. The vacuum is generated by a liquid ring vacuum pump 34 and communicated to the primary air-water separator 22 through provided polyvinyl chloride polymer ("PVC") piping 31. A solenoid valve vacuum release mechanism 25 is dependently attached to, and in communication with, the upper tee 37 of the air, water and product inlet assembly 21. The solenoid valve vacuum release mechanism 25 is operable for release, at appropriate intervals as will be understood further herein, of the vacuum provided within the primary and secondary air-water separators 22, 23. In the preferred embodiment of the present invention, the solenoid valve release mechanism 25 is the 240-volt alternating current ("VAC") ASCO Model 8215B80 explosion proof and rain tight normally-closed vacuum valve, commercially available from Automatic Switch Company of Florham Park, N.J.

Figures 4, 5:
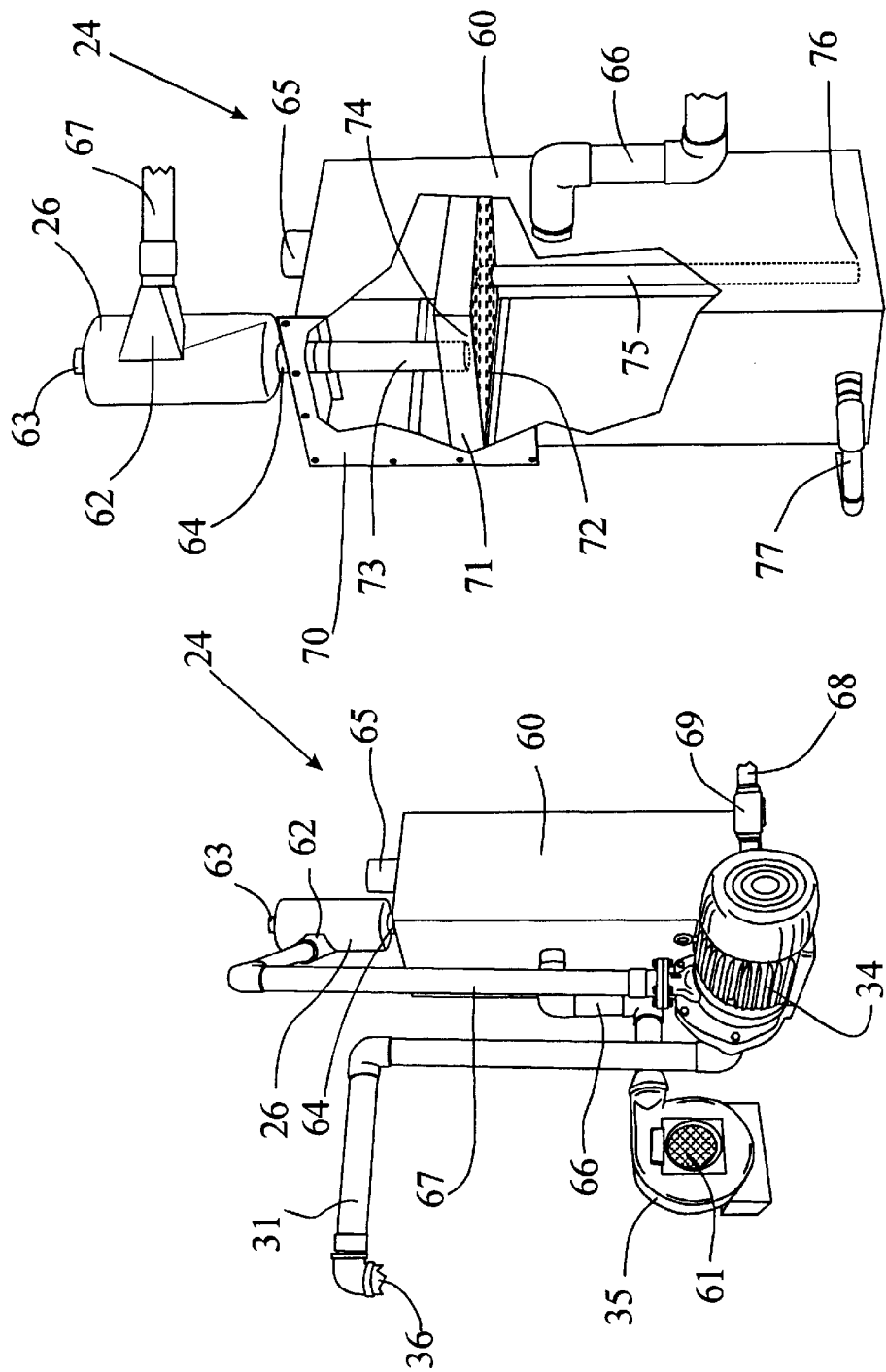
FIG. 4 shows, in perspective view, the liquid ring vacuum pump 34, with self-contained cooling system 24, of the preferred embodiment of the present invention.
FIG. 5 shows, in cut-away perspective view, details of the cooling tower 60 of the self-contained cooling system 24 of the preferred embodiment of the present invention.

Referring now specifically to FIG. 4, the liquid ring vacuum pump 34 is shown with its self-contained cooling system 24. Utilization of a liquid ring vacuum pump allows for highly efficient production of high vacuum in 24 hour per day continuous operation under even the most demanding environmental conditions. Further, such pumps have no metal-to-metal contact between rotating and stationary elements and consequently require little or no maintenance and produce little or no vibration obviating any need for special foundation. While liquid ring vacuum pumps enjoy the aforementioned advantages, their operation requires that they be designed to extremely tight tolerances; therefore, it is critical that throughput of solid phase matter be minimized to prevent excessive wear or catastrophic failure of the pump which is among the most expensive components of the present invention. While other manufacturers have focused, and continue to focus, elsewhere in attempting to improve upon prior technology, the present invention is premised, in part, upon first recognizing that the limitations to the efficacy of prior technologies is significantly related to problems associated with allowing solid phase matter or liquids containing high total dissolved solids ("TDS"), such as contaminated water or ground water, to enter the liquid ring pump. The non-obvious utility of the present invention, in fact, becomes highly incontrovertible in light of this first recognition of the significance of a major limitation.

The liquid ring vacuum pump 34 of the preferred embodiment of the present invention is the 15-horsepower ("hp"), 240-volt, 3-phase, continuous power Atlantic Fluidics Model A200 liquid ring vacuum pump, commercially available from Atlantic Fluidics, Inc. of Stamford, Conn. This pump is capable of producing flow of approximately 225 cubic feet per minute ("cfm") at 26 inches of mercury vacuum. The liquid ring vacuum pump 34, like all such pumps, must be provided with a continuous flow of "seal" water for maintenance of a gas-tight, fluid seal between its rotating and stationary elements and further for general cooling. In the preferred embodiment of the present invention, the seal water is provided from a quasi closed-loop, self-contained cooling system 24. As will be apparent herein, this architecture affords significant advantages over those employing non-recycled seal water sources.

The self-contained cooling system 24 of the preferred embodiment generally comprises the liquid ring vacuum pump 34, an air-water separator 26, a forced draft, gravity flow cooling tower 60, a cooling water holding tank 119, a cooling tower blower 35, and interconnecting PVC plumbing 67, 68, 77. As best illustrated by FIG. 4, seal water from the cooling water holding tank 119 is provided to the liquid ring pump 34 contemporaneously with formation air drawn under vacuum from the primary air-water separator 22. The formation air and water mixture is discharged from the liquid ring pump 34 into the air-water separator 26 dependently mounted atop the cooling tower 60. The formation air comprises a mixture of fresh air drawn through the bronze gate valve 44 of the air, water and product inlet assembly 21 and gaseous phase contaminants drawn through the quick-connect coupler 43 of the air, water and product inlet assembly 21; it should, at this point in treatment, be considered contaminated. The formation air is thus separated from the seal water and allowed to escape the air-water separator 26 through a provided discharge port 63, after which appropriate treatment may be applied as understood further herein. The separated seal water is discharged from the bottom of the air-water separator 26 through a drop pipe 73 having a terminus 74 submerged below the surface level 121 of water contained by a provided perforated tray 71. The functionality of this arrangement will be understood further herein. Finally, the seal water flows into the lower portion of the cooling tower 60 through a provided drain pipe 75 and then is communicated through a PVC pipe 77 to the cooling water holding tank 119, ready for recirculation to the liquid ring vacuum pump 34 through a PVC pipe 68 which includes a Watts strainer 69 for preventing any foreign material which may be in the cooling water from entering, and subsequently damaging, the liquid ring vacuum pump 34.

The air-water separator 26 of the preferred embodiment of the present invention, which doubles in function as a silencer for the liquid ring vacuum pump 34, is the Burgess-Manning Model WSS-3 water separator and silencer, commercially available from Burgess-Manning, Inc. of Orchard Park, N.Y. This separator is capable of removing up to 99% of inserted free liquid while providing over 5 decibel ("dB") reduction in discharge noise from 63 to 1000 Hertz ("Hz") and over 3 dB reduction up to 8000 Hz, all at greater than 2000 cfm throughput. The separator, which is of all-welded steel construction, is additionally provided with National Pipe Thread ("NPT") pipe threading at the formation air and seal water mixture inlet 62, the formation air outlet 63 and the seal water outlet 64. As known to those of ordinary skill in the art, NPT threading is tapered so as to promote "self-locking" of connections, resistant to loosening due to vibration or expansion and contraction over temperature. Such threading is particularly suited to the outlets 63, 64 as the air-water separator 26 is dependently attached atop the cooling tower 60 by securing the seal water outlet 64 to a provided coupling and, if additional treatment devices are necessary, such devices are dependently attached atop the air-water separator 26 by coupling to the formation air outlet 63.

As above-noted, the formation air is considered contaminated and therefore generally necessitates special handling or treatment. The type of treatment necessitated will ordinarily depend upon the emission rate of organic compounds, as regulated in accordance with applicable state and federal standards for allowable air emissions. In the case of a liquid hydrocarbon spill-type application, such handling may entail simple direct discharge or transfer to a thermal oxidizer, flare, granular activated carbon ("GAC") treatment system, or other appropriate discharge point, all of which are known to those of ordinary skill in the art. In remediation applications requiring treatment devices, these devices generally may be directly and dependently attached to the formation air outlet 63 atop the air-water separator 26. Likewise, in remediation applications requiring off-system transfer of formation air, appropriate plumbing may be connected to the formation air outlet 63.

As above-noted, the separated seal water collects in a perforated tray 71. A suitable volume of high pressure air, produced by the cooling tower blower 35 and communicated through a PVC pipe 66 to the lower portion of the cooling tower 60, is forced through perforations in the bottom of the tray 72 and in turn through the collected seal water and out a provided vent 65. This counter current airflow cools the seal water prior to discharge into the lower portion of the cooling tower 60. Because the airflow produced by the cooling tower blower 35 may be of very high volume and pressure, it is important that the drop pipe 73 from the seal water outlet 64 of the air-water separator 26 terminates below the surface level 121 of water collected by the perforated tray 71. Failure to maintain the drop pipe terminus 74 below the surface level 121 could result in back pressure into the air-water separator 26 which in turn may disrupt or prevent separation of the seal water and formation air or even force seal water through the formation air outlet 63. Likewise, the drain pipe 75 from the perforated tray has its terminus 76 below the water level residual in the lower portion of the cooling tower 60 in order to prevent back pressure from impeding flow which in turn could result in overflow of the tray 71 in addition to the aforementioned complications.

The cooling tower blower 35 of the preferred embodiment of the present invention is the American Fan Company Model AF-1078 pressure blower as provided with a 240-volt, 3-phase, explosion proof motor, all commercially available from the American Fan Company of Fairfield, Ohio or its manufacturer's representatives. The preferred embodiment is additionally provided with an inlet screen 61 to prevent introduction of foreign matter into the self-contained cooling system 24 which in turn may result in severe damage to the liquid ring vacuum pump 34. A vane switch 128 is provided within the PVC pipe 66 connecting the cooling tower blower 35 to the cooling tower 60. In the event of diminished or interrupted airflow through the PVC pipe 66, this switch 128 interrupts electrical power supplied to the liquid ring pump 34, thus preventing the inevitable damage that would result from operating the liquid ring pump 34 without cooling seal water.

It is to be expected that the high-vacuum ground water and soil remediation system 20 of the present invention will find utility under a vast array of environmental conditions. It is not uncommon to require remediation in remote locations where a clean water source is relatively unavailable. The recycled cooling water system of the preferred embodiment of the present invention, which requires no continuous source of clean water, is particularly advantageous in such locations. Even in locations where a continuous source of clean water is available, however, the disclosed system remains preferred inasmuch as it obviates much of the need for water handling, which is often very labor intensive under field conditions, while concurrently promoting conservation of natural water resources.

Even in relatively hot and arid locations, the quasi closed self-contained cooling system 24 of the preferred embodiment requires little maintenance of water levels. However, in very hot or very arid locations, evaporation losses can require daily addition of cooling water. In such environments, the cooling system may be alternatively implemented with a fully closed radiator-type cooling system. In any case, the cooling water holding tank 119 is provided with a float switch 120 which interrupts power to the liquid ring vacuum pump 34 in the event the cooling seal water becomes depleted.

As one, two or three phase contaminants enter the primary air-water separator 22 through the carbon steel inlet pipe 40 of the air, water and product inlet assembly 21, under vacuum produced by the liquid ring vacuum pump 34, centrifugal motion of the contaminants is established within the primary air-water separator 22. As previously noted, the formation air, which separates from the solid and liquid phase contaminants relatively quickly, is drawn through the outlet 36 atop the primary air-water separator's dish top, through provided PVC piping 31 and into the liquid ring vacuum pump 34 after which it is sent to the air-water separator 26 atop the self-contained cooling system 24 for further treatment as has been discussed. Under gravitational force, heavy solid phase contaminants and large particulate drop out of the centrifugal flow and settle in the bottom of the primary air-water separator 22. This "knocked-out" solid phase is removed from the primary air-water separator 22 through a provided coupler 49 and ball valve 32 as will be understood herein. The liquid phase contaminant, remaining in centrifugal motion, is forced into the secondary air-water separator 23 through interconnecting steel pipes 45, 46. In the preferred embodiment, an upper steel pipe 45 and a lower steel pipe 46 are provided so as to prevent system shut-down due to clogging of the interconnecting pipes 45, 46, as may result during remediation applications where a high quantity of solid phase contaminant is encountered. Further, as will be understood herein, the vacuum internal to the primary and secondary air-water separators 22, 23 is periodically relieved through operation of the solenoid valve vacuum release mechanism 25; during this function, provision of an upper steel pipe 45 in addition to the lower steel pipe 46 allows for vacuum relief in the secondary air-water separator 23 even after liquid phase contaminant levels rise above the lower steel pipe 46, thus maintaining equivalent hydraulic head, and preventing liquid contaminants from being undesirably drawn, between the primary and secondary air-water separators 22, 23.

Once in the secondary air-water separator 23, the now mostly liquid phase contaminant settles, allowing additional particulate and solid phase contaminant to separate and gravity flow to the bottom of the secondary air-water separator 23. As in the primary air-water separator 22, a coupler 50 and ball valve 33, and additionally a clean-out port 59, are provided in the secondary air-water separator 23 for removal of the knocked-out solid phase as will be understood herein.

Figure 3:
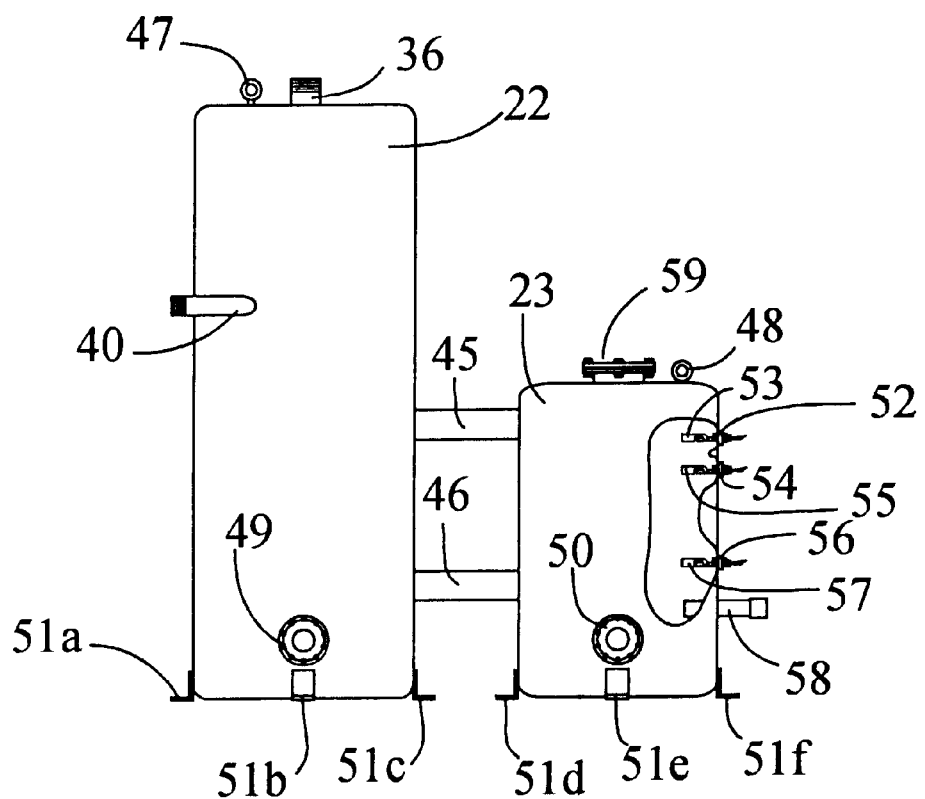
FIG. 3 shows, in profile view, the primary and secondary air-water separators 22, 23 of the preferred embodiment of the present invention, with particular emphasis given to the various weldments and other elements of their manufacture.

As illustrated by FIG. 3, a plurality of 2-inch steel couplers 52, 54, 56 with female NPT threading are provided in the secondary air-water separator 23. Each coupler 52, 54, 56 is inserted with an intrinsically safe level control finger switch 53, 55, 57, such as the GEMS Model LS-7 Type 6 finger switch, utilized in the preferred embodiment of the present invention and commercially available from the GEMS Sensors Division of IMO Industries, Inc. of Atlanta, Ga. These finger switches 53, 55, 57 are constructed of engineered plastics for broad compatibility in water, oils and chemicals. The type 6 switches 53, 55, 57 of the preferred embodiment each have an aluminum body and polysulfone float. In the present invention, a high level switch 55, placed 27 inches above the dish bottom of the secondary air-water separator 23, operates to initiate pump down of the secondary air-water separator 23. When fluids rise above the high level switch 55, the control system, detailed further herein, of the present invention automatically operates to simultaneously activate the solenoid valve vacuum release mechanism 25, dependently attached to the air, water and product inlet assembly 21, and a provided solenoid valve pump control mechanism 127 interposed within the air feed to a provided double diaphragm pneumatic transfer pump 78. Activation of the solenoid valve vacuum release mechanism 25 releases the internal vacuum in the primary and secondary air-water separators 22, 23. Release of the internal vacuum is necessary to allow for pumping of fluids under atmospheric conditions. Activation of the solenoid valve pump control mechanism 127 establishes operable air flow, from a provided industrial air compressor 27, to the provided double diaphragm pneumatic transfer pump 78, for transfer of fluids from within the secondary air-water separator 23 to an oil-water separating fractionation tank 90.

It is critical to the present invention that fluid transfer between the secondary air-water separator 23 and the oil-water separating fractionation tank 90 be accomplished in some manner which prevents emulsification of the fluids; therefore, fluid transfer in the preferred embodiment of the present invention is performed under atmospheric conditions by a double diaphragm pneumatic transfer pump 78. The double diaphragm pneumatic transfer pump 78, which is designed to push fluids, does not cause shearing of the fluids—the primary cause of emulsification due to pumping.

The double diaphragm pneumatic transfer pump 78 of the preferred embodiment of the present invention is the Wilden Model M-2, 37 gallon per minute ("GPM") air operated double diaphragm pump, commercially available from Wilden Pump & Engineering Co. of Colton, Calif. This pump is specifically designed for use with fluids that are thick, abrasive or have sensitive texture requiring gentle pushing action. Although those of ordinary skill in the art will recognize other means for fluid transfer, this type of pump, which has no rotors, lobes or gears in contact with the transferring fluid and is therefore highly immune to fluid shearing, is preferred.

The double diaphragm pneumatic transfer pump 78 is air-operated by a provided industrial air compressor 27. In the preferred embodiment of the present invention, compressed air for operation of the double diaphragm pneumatic transfer pump 78, and other applications, such as operation of an air sparger or down-hole pneumatic pump, as are known by those of ordinary skill in the art, is provided by the 5 hp Champion Model VR 5-8 two-stage, tank mounted air compressor, commercially available from Champion Pneumatic Machinery Co. Inc. of Princeton, Ill. This model, incorporated on an 80 gallon air tank 28, produces up to 16.5 cfm airflow at up to 175 pounds per square inch gage ("PSIG").

The control system of the preferred embodiment of the present invention includes a GEMS Latching Safe-Pak latching relay, commercially available from the GEMS Sensors Division of IMO Industries, Inc. of Atlanta, Ga. Once fluids within the secondary air-water separator 23 rise above the high level switch 55, intrinsically safe solid state circuitry of the Safe-Pak latching relay latches, meaning a relay is activated until such time as a second event, in this case activation of a low level switch 57, causes deactivation of the relay. Through this operation, the solenoid valve vacuum release mechanism 25 and the solenoid valve pump control mechanism 127 remain activated until fluids are pumped down to below the level of the low level switch 57, placed 16 inches above the dish bottom of the secondary air-water separator 23. Once fluids are pumped below the low level switch 57, the Safe-Pak latching relay latches back, deactivating both the solenoid valve vacuum release mechanism 25 and the solenoid valve pump control mechanism 127. The double diaphragm pneumatic transfer pump 78 then ceases operation and vacuum is returned to the primary and secondary air-water separators 22, 23 allowing extraction to resume.

In the preferred embodiment of the present invention, a third finger switch 53, placed 31 inches above the dish bottom of the secondary air-water separator 23, is provided as a high level override. In the event fluids within the secondary air-water separator 23 should rise above the high level override switch 53, a provided GEMS Safe-Pak relay operates to interrupt power to the liquid ring vacuum pump 34. Once fluids return to a level below the high level override switch 53, power may be resumed to the liquid ring vacuum pump 34 under operator control as will be understood herein. The GEMS Safe-Pak relay utilized in the preferred embodiment is an intrinsically safe solid state relay, commercially available from the GEMS Sensors Division of IMO Industries, Inc. of Atlanta, Ga.

Figure 6:
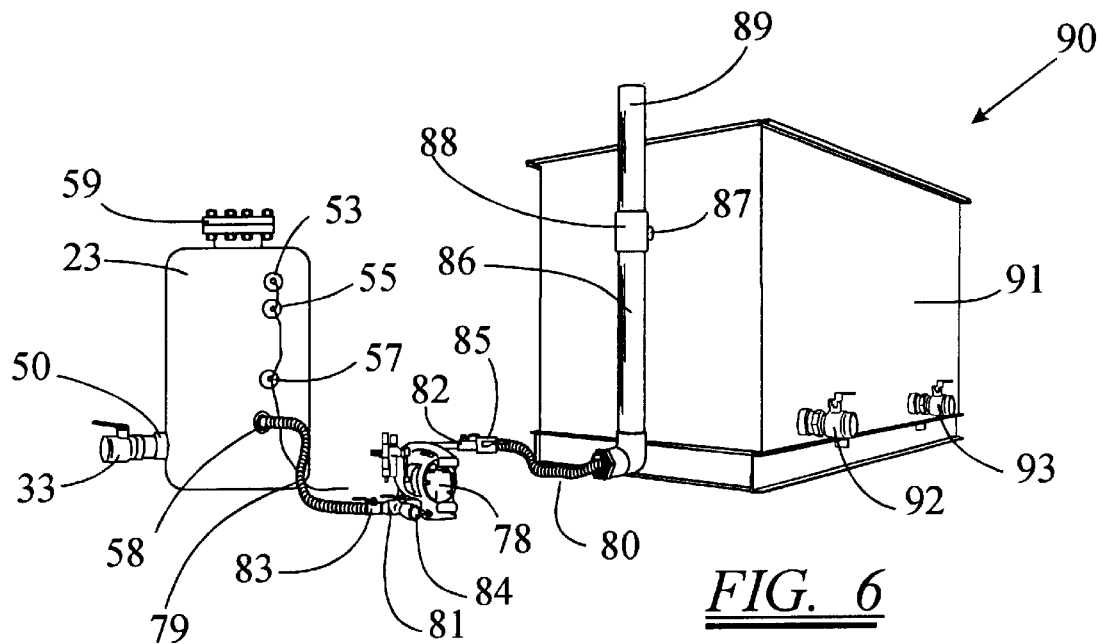
FIG. 6 shows, in perspective view, the double diaphragm pneumatic transfer pump 78, as interposed for transfer of contaminated liquid phase between the secondary air-water separator 23 and the oil-water separating fractionation tank 90 of the preferred embodiment of the present invention.

As depicted in FIG. 6, the double diaphragm pneumatic transfer pump 78 delivers the contaminated liquid phase from the secondary air-water separator 23 to the influent 86 of an oil-water separating fractionation tank 90. Shown in FIG. 3, the secondary air-water separator 23 is provided with a 2-inch steel coupler 58, placed 10 inches above the dish bottom of the secondary air-water separator 23, where interconnecting hosing 79 is attached for delivery of the contaminated liquid phase to the double diaphragm pneumatic transfer pump 78. Additional hosing 80 is provided for interconnection of the double diaphragm pneumatic transfer pump 78 to the fractionation tank's influent 86. The double diaphragm pneumatic transfer pump 78 of the preferred embodiment of the present invention is provided with quick-connect type couplers 81, 82 (and others not called out) for attachment of transfer hoses 79, 80 (and others not shown) and ball valves 83, 84, 85 (and another not called out) for operator control of flow paths. This arrangement allows for utilization of the double diaphragm pneumatic transfer pump 78 in water handling or clean-out operations, as will be more fully understood herein. The influent 86 of the oil-water separating fractionation tank 90 is provided with a tee joint 88 to a vent 89 which allows the influent 86 to act as a pulsation dampener. Fluids, which are rapidly pushed by the double diaphragm pneumatic transfer pump 78 into a one-inch diameter hose 80, enter the 4-inch diameter influent 86 and pulse above the inlet 87 to the oil-water separating fractionation tank 90, toward the provided vent 89. Fluids then gravity flow back down, through the provided tee 88, and into the inlet 87. This arrangement is beneficial in further preventing emulsification of the transferred liquid phase contaminant.

Figure 7A:
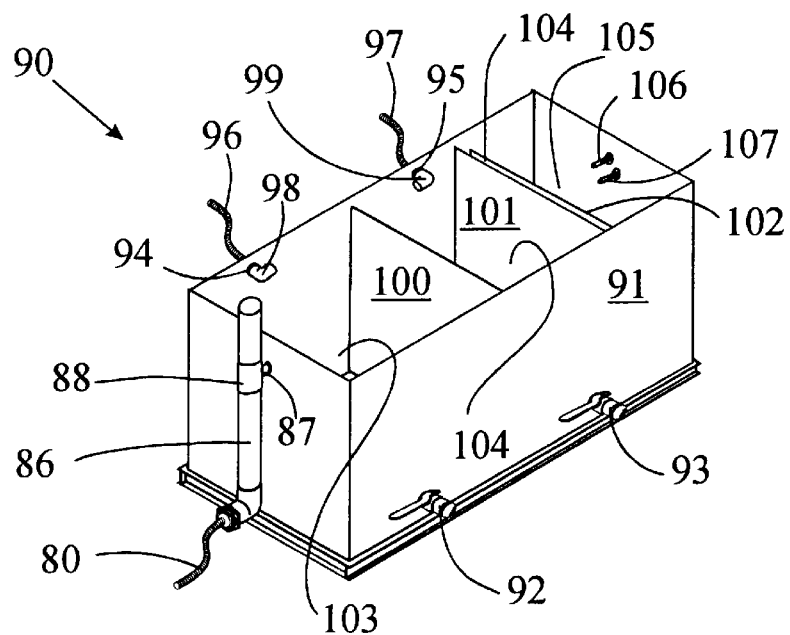
FIGS. 7A, 7B and 7C show, in various views, the oil-water separating fractionation tank 90 of the preferred embodiment of the present invention, where, in particular, FIG. 7A generally depicts, in isometric view, the provided influent 86 and product effluents 96, 97, FIG. 7B generally depicts, in perspective view, the provided water effluent 109 and level sensors 106, 107, 108, and FIG. 7C generally depicts, in cut-away perspective view, the provided separation weirs 100, 101, 102.
Figure 7B:
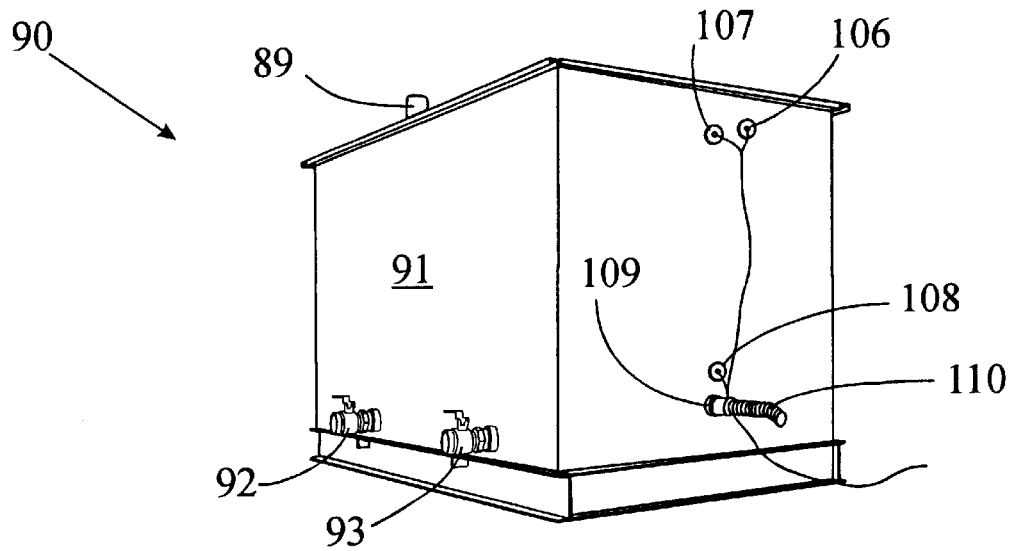
Figure 7C:
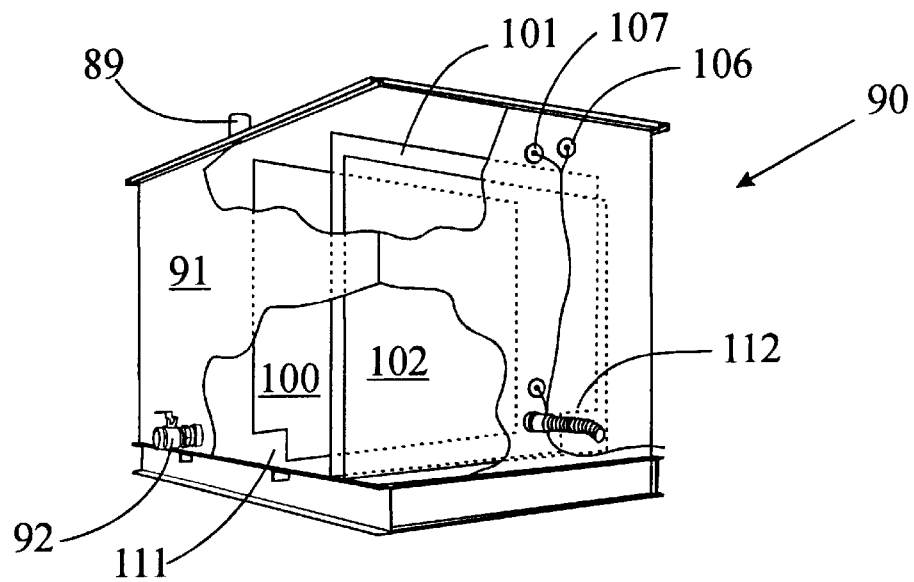

Referring to FIGS. 7A, 7B and 7C, details of the oil-water separating fractionation tank 90 of the preferred embodiment of the present invention are shown. The oil-water separating fractionation tank 90 comprises a rectangular-shaped steel tank 91 having a plurality of flow-controlling weirs 100, 101, 102 which partition the tank 91 into first 103, second 104, third 150 and fourth 105 separation compartments. Contaminated liquid phase enters the oil-water separating fractionation tank 90 into the first compartment 103 through the influent inlet 87. The first weir 100, defining the boundary between the first compartment 103 and the second compartment 104, is manufactured so as to restrict flow between the first compartment 103 and second compartment 104 exclusively through a provided cutout 111 located in a bottom corner of the weir 100. No fluids pass over the first weir 100. Likewise, the second weir 101, defining the boundary between the second compartment 104 and the third compartment 150, is manufactured so as to restrict flow between the second compartment 104 and third compartment 150 exclusively through a provided cutout 112 located in a bottom corner of the weir 101 on the opposite side of the tank 91 as is located the cutout 111 in the first weir 100. As with the first weir 100, no fluids pass over the second weir 101. The third weir 102, defining the boundary between the third compartment 150 and the fourth compartment 105, is manufactured so as to allow fluid flow over its top.

The size of the provided compartments 103, 104, 150, 105 and spacing of provided weirs 100, 101, 102 are designed in accordance with expected flow rates in order to result in appropriate retention time for phase separation of hydrocarbons present in the contaminated liquid phase. Pertinent considerations are known to those of ordinary skill in the art. The oil-water separating fractionation tank 90 of the preferred embodiment of the present invention, which is designed to have twice the necessary retention time, is manufactured within a tank 91 102 inches in length, 48 inches in width and 54 inches in height and constructed of at least 10 gauge steel. Designed for a maximum flow rate of 24 gpm in applications encountering crude oil with American Petroleum Institute ("API") gravity less than 35 and a maximum of 45 gpm in applications encountering crude oil with API gravity greater than 35, the weirs 100, 101, 102 of the oil-water separating fractionation tank 90 of the preferred embodiment are spaced to result in first 103, second 104, third 150 and fourth 105 compartment lengths of 48, 30, 6 and 18 inches, respectively. The first 103 and second 104 weirs are each provided with cutouts 111, 112 measuring 5 inches in width and 6 inches in height. Finally, the third weir 102 is designed to allow a 0.5-inch overflow of fluid.

Figure 8:
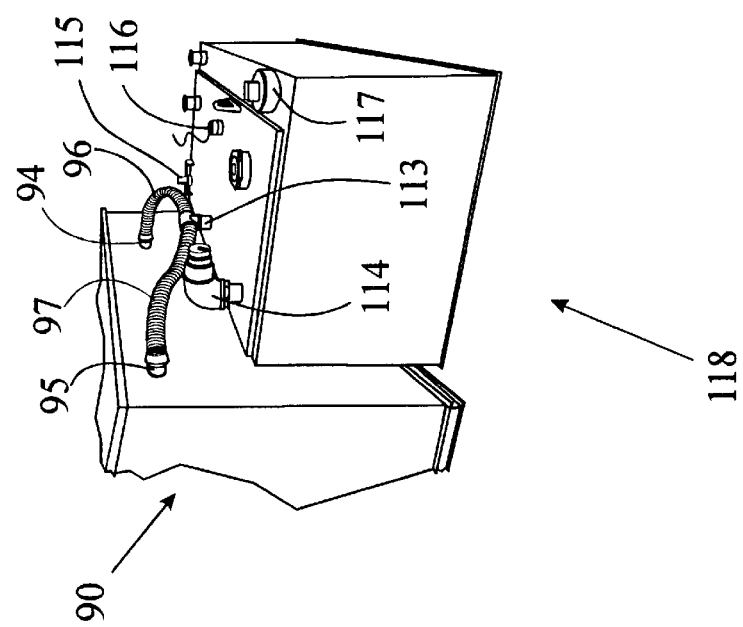
FIG. 8 shows, in perspective view, the double-contained product storage tank 118 of the preferred embodiment of the present invention, with provided hosing 96, 97 for communication of separated product from the oil-water separating fractionation tank 90.
Figure 9:
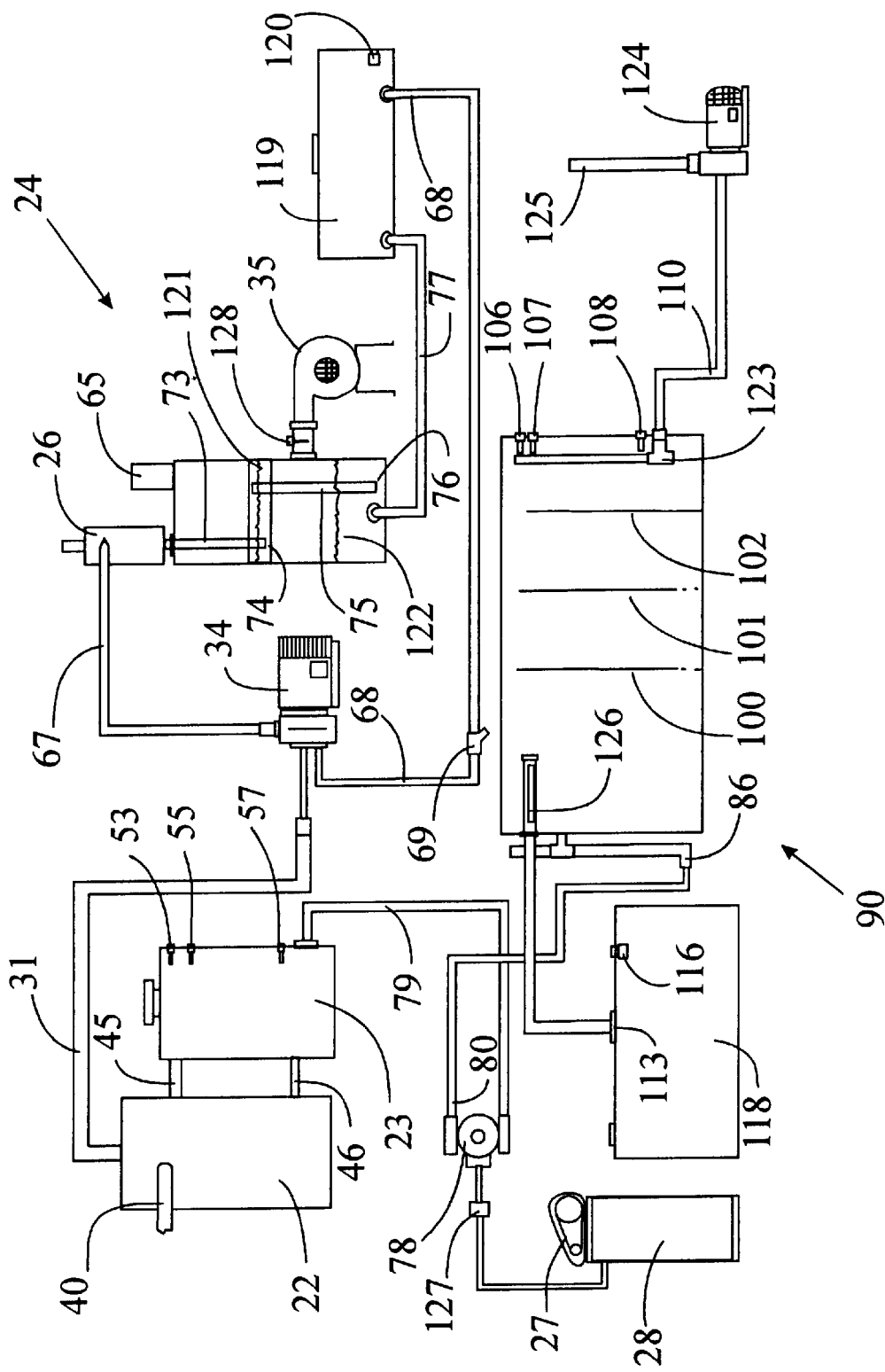
FIG. 9 shows, in schematic view, the overall operation of the preferred embodiment of the present invention.

As shown in FIGS. 7A and 8, the first and second separation compartments 103, 104 are each provided with a product effluent 94, 95 for drainage of phase separated hydrocarbons to a double-contained product storage tank 118. In the preferred embodiment, the product effluents 94, 95 are provided with rotatable steel elbows 98, 99 which may be positioned so as to capture only phase-separated hydrocarbons, allowing ground water to pass through the oil-water separating fractionation tank 90 to a provided water effluent 109, as will be understood herein. In an alternate embodiment, depicted schematically in FIG. 9, the product effluents 94, 95 may be provided with a straight pipe 126, rotatable about its central axis, and having a slot for capture of the phase-separated hydrocarbons. If necessary, additional hydrocarbons may be captured by providing a coalescing medium within the oil-water separating fractionation tank 90, as is known to those of ordinary skill in the art. Any coalescing medium utilized, however, is preferably placed in the second separation compartment 104 so as to prevent interference with inflow of contaminated liquid phase through the inlet 87 of the oil-water separating fractionation tank 90. In an alternate embodiment, the fourth separation chamber 105 may be provided with an air stripper by adding a source of pressurized air and perforated trays, much as are found in the seal water cooling tower 60 of the present invention.

As illustrated by FIG. 7C, a plurality of 2-inch steel couplers with female NPT threading are provided in the oil-water separating fractionation tank 90. Each coupler is inserted with an intrinsically safe level control finger switch 106, 107, 108, such as the GEMS Model LS-7 Type 6 finger switch, utilized in the preferred embodiment of the present invention. In the present invention, a high level switch 107, placed 45 inches above the bottom of the oil-water separating fractionation tank 90, operates to initiate pump down of the oil-water separating fractionation tank 90. When fluids rise above the high level switch 107, the control system, detailed further herein, of the present invention automatically operates to activate an electrically operated centrifugal transfer pump 124, which is connected to the oil-water separating fractionation tank 90 through hosing 110 connected to the water effluent 109, for groundwater transfer as will be understood herein. The water effluent 109 is located 6 inches from the bottom of the oil-water separating fractionation tank 90 in the fourth separation compartment 105. The electrically operated centrifugal transfer pump 124 of the preferred embodiment of the present invention is the Gorman-Rupp Model 81-1/2, 0.75-hp, 3-phase, explosion proof centrifugal transfer pump, commercially available from Gorman-Rupp, Inc. of Mansfield, Ohio.

Once activated, the electrically operated centrifugal transfer pump 124 transfers groundwater—remaining after separation of phase separated hydrocarbons—from the oil-water separating fractionation tank 90 to an appropriate site for treatment as necessary. The type of treatment necessitated will ordinarily depend upon the quality of the water, as regulated in accordance with applicable state and federal standards for allowable concentrations of individual and collective hydrocarbon compounds. Such handling may entail direct injection into a well, in the case where water quality requires no treatment, or more elaborate handling such as GAC filtration, evaporation or air stripping through a counter current tower, all of which are known to those of ordinary skill in the art.

The control system of the preferred embodiment of the present invention includes a GEMS Latching Safe-Pak latching relay for control of the oil-water separating fractionation tank pump down. Once fluids within the oil-water separating fractionation tank 90 rise above the high level switch 107, intrinsically safe solid state circuitry of the Safe-Pak latching relay latches until activation of a low level switch 108, causes deactivation of the relay. Through this means, the centrifugal transfer pump 124 operates until fluids are pumped down to below the level of the low level switch 108, placed 11 inches above the bottom of the oil-water separating fractionation tank 90. Once fluids are pumped below the low level switch 108, the Safe-Pak latching relay latches back, deactivating the centrifugal transfer pump 124. The water effluent 109 is provided with a vented tee 123 with a stand pipe, shown in FIG. 9, in order to prevent siphoning of groundwater after deactivation of the electrically operated centrifugal transfer pump 124. Through this provision, any phase separated hydrocarbons which may have entered the fourth separation compartment 105 are prevented from entering the water effluent 109.

In the preferred embodiment of the present invention, a third finger switch 106, placed 46.5 inches above the bottom of the oil-water separating fractionation tank 90, is provided as a high level override. In the event fluids within the oil-water separating fractionation tank 90 should rise above the high level override switch 106, a provided GEMS Safe-Pak relay operates to interrupt power to the liquid ring vacuum pump 34. Once fluids return to a level below the high level override switch 106, power may be resumed to the liquid ring vacuum pump 34 under operator control as will be understood herein.

Finally, the first and second separation compartments 103, 104 of the oil-water separating fractionation tank 90, are provided with a steel couplings having gate valves 92, 93 for clean-out operations, as will be understood herein. Additionally, the oil-water separating fractionation tank 90 may be provided with a cover in order to prevent foreign matter from entering.

The double-contained product storage tank 118 of the preferred embodiment of the present invention is the Ultra-Tank 280 gallon double wall hazardous material storage tank, commercially available from UltraTank, Inc. of Tampa, Fla. In the preferred embodiment, the double-contained product storage tank 118 is equipped with a fill tube 113, pump out drop tube 114, direct reading level indicator 115, high level switch 116 and vent 117.

Phase-separated hydrocarbons from the oil-water separating fractionation tank 90 enter the double-contained product storage tank 118 through the provided hoses 96, 97 to the fill tube 113. The provided vent 117 prevents back pressure from forming within the double-contained product storage tank 118 thus ensuring uninhibited gravity flow from the oil-water separating fractionation tank 90. The phase-separated hydrocarbons are temporarily stored in the double-contained product storage tank 118 until they may be conveniently transferred to permanent storage or other treatment. At that time, the double-contained product storage tank 118 is pumped down by an appropriate means such as a vacuum truck, as is known to those of ordinary skill in the art, through the provided pump out drop tube 114. The level of the phase-separated hydrocarbons may be conveniently monitored through the provided direct reading level indicator 115 for coordination of this handling; however, in the event that levels should rise to the top of the double-contained product storage tank 118, a provided high level switch 116 is operable for interruption of power to the liquid ring vacuum pump 34.

Because hazardous vapors may be present during operation of the high-vacuum ground water and soil remediation system 20 of the present invention, the electrical systems of the preferred embodiment are designed for intrinsic safety. In particular, the preferred embodiment complies with Class 1, Division II standards of the National Electric Code in providing rigid conduits with sealed terminations for electrical communication. Further, all components with potential for direct contact with volatile solids, liquids or vapors are placed in intrinsically safe, low-voltage circuits operable off the provided control system.

Figure 10:
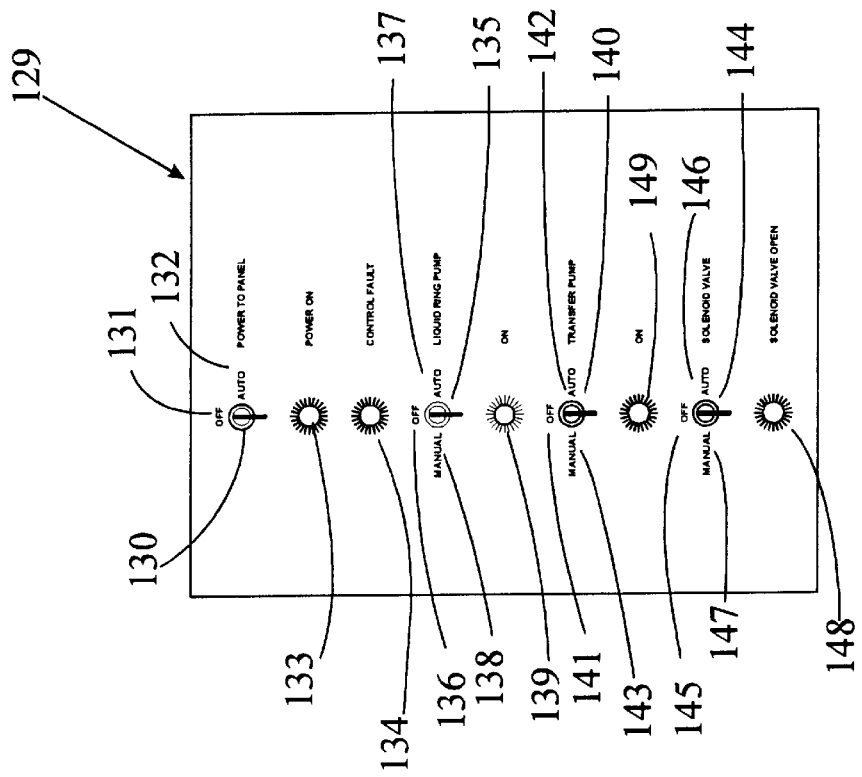
FIG. 10 shows, in plan view, the operator's control panel 129 of the preferred embodiment of the present invention.

Referring specifically to FIG. 10, the operator's control panel 129 of the preferred embodiment of the present invention is detailed. A main power switch 130 is provided for delivery of primary power to the high-vacuum ground water and soil remediation system 20 by rotating the switch 130 from an "OFF" position 131 to an operable "AUTO" position 132. "POWER ON" is indicated by a green power on lamp 133 provided on the control panel 129. A "CONTROL FAULT," indicating a high level condition in the secondary air-water separator 23, high condition in the oil-water separating fractionation tank 90, high level condition in the double-contained product storage tank 118, low condition in the cooling water holding tank 119 or activation of the cooling tower blower's vane switch 128 and corresponding interruption of power to the liquid ring vacuum pump 34, is indicated by a red control fault lamp 134 provided on the control panel 129.

Power is normally delivered to the liquid ring vacuum pump 34 by rotating a provided liquid ring pump switch 135 from an "OFF" position 136 to an "AUTO" position 137. Power will then be provided to the liquid ring vacuum pump 34 so long as no fault condition occurs. In the event a fault condition does occur, the liquid ring pump switch 135 must be cycled through the "OFF" position 136 in order for power to resume to the liquid ring vacuum pump 34. Power can be provided to the liquid ring vacuum pump 34 in spite of an existing fault, however, by rotating the liquid ring pump switch 135 to a provided "MANUAL" position 138.

A provided transfer pump switch 140 controls operation of the electrically operated centrifugal transfer pump 124. The transfer pump switch 140 is rotated from an "OFF" position 141 to an "AUTO" position 142 for Safe-Pak relay operation of the electrically operated centrifugal transfer pump 124, as previously detailed herein. Safe-Pak operation of the electrically operated centrifugal transfer pump 124 may be bypassed, allowing direct power supply to the transfer pump 124, by rotating the transfer pump switch 140 to a provided "MANUAL" position 143. A green transfer pump indicator lamp 149 is provided on the control panel 129. This lamp 149 remains lit during AUTO operations unless a low level condition deactivates the electrically operated centrifugal transfer pump 124.

A provided solenoid valve switch 144 is operable to allow Safe-Pak or bypassed activation of the solenoid valve vacuum release mechanism 25 and solenoid valve pump control mechanism 127. Rotation of the solenoid valve switch 144 from an "OFF" position 145 to an "AUTO" position 146 allows Safe-Pak relay operation of the solenoid valve mechanisms 25, 127, as previously detailed herein. Rotation of the solenoid valve switch 144 to a provided "MANUAL" position 147 bypasses the Safe-Pak operation, allowing direct operation of the double diaphragm pneumatic transfer pump 78 for water transfer or clean-out operations.

As previously described, the double diaphragm pneumatic transfer pump 78 of the preferred embodiment of the present invention is provided with quick-connect type couplers 81, 82 (and others not called out) for attachment of transfer hoses 79, 80 (and others not shown) and ball valves 83, 84, 85 (and another not called out) for operator control of flow paths. Clean-out and water transfer may be accomplished by utilizing the double diaphragm pneumatic transfer pump 78, which is capable of pumping heavy sludge, in the MANUAL mode with provided transfer hoses 79, 80 replaced by other appropriate hosing (not shown). This other hosing may be directly coupled to the various clean-out valves as have been described herein.

Finally, the control panel 129 is provided with a green solenoid valve lamp 148 which indicates activation of the solenoid valve vacuum release mechanism 25 and solenoid valve pump control mechanism 127.

Although those of ordinary skill in the art will readily recognize the many variations, alterations, modifications, substitutions and the like as are readily possible, especially in light of this description, the foregoing detailed description has been provided as exemplary of the preferred embodiment. Because the scope of the present invention is much broader than any particular embodiment, the foregoing detailed description should not to be construed as a limitation of the scope of the present invention, which is limited only by the claims appended hereto.

What is claimed is:

1. A system for remediating hydrocarbon contaminated matter, comprising:

a centrifugal separating tank adapted for separating solid, liquid and gaseous phases of contamination, said tank having a vapor phase outlet, a liquid phase outlet, and a multi-phase inlet;

a vacuum source fluidly connectable with the vapor phase outlet of said centrifugal separating tank for drawing a flow of hydrocarbon-contaminated matter through the multi-phase inlet and into said centrifugal separating tank;

an automatically-actuable vent in fluid communication with said centrifugal separating tank for reducing negative pressure levels within said centrifugal separating tank, thereby enabling flow of liquid phases from the liquid phase outlet of said centrifugal separating tank;

a fractionation system in fluid communication with the liquid phase outlet of said centrifugal separating tank through an interposed low-shear pump, said low-shear pump being adapted to minimize emulsification of the liquid phases during pumping of the liquid phases from said centrifugal separating tank to said fractionation system; and a fill sensor for sensing the level of the liquid phases in said centrifugal separating tank, said fill sensor being in operable communication with said automatically-actuable vent and said low-shear pump for actuating said vent and activating said pump when the liquid phases reach a predetermined level within said centrifugal separating tank.

* * * * *